United States Patent [19]
Yonekura et al.

[11] Patent Number: 4,833,318
[45] Date of Patent: May 23, 1989

[54] REFLECTION-TYPE PHOTOSENSOR

[75] Inventors: Atushi Yonekura; Katsutoshi Soejima, both of Tokyo, Japan

[73] Assignee: NEC Corporation, Tokyo, Japan

[21] Appl. No.: 111,330

[22] Filed: Oct. 22, 1987

[30] Foreign Application Priority Data

Oct. 22, 1986 [JP] Japan .................... 61-252336

[51] Int. Cl.⁴ .................................. G02B 27/00
[52] U.S. Cl. .......................... 250/239; 250/551
[58] Field of Search ............... 250/239, 551; 357/19

[56] References Cited
U.S. PATENT DOCUMENTS
4,456,828 6/1984 Mason et al. .............. 250/239

Primary Examiner—Edward P. Westin
Attorney, Agent, or Firm—Sughrue, Mion, Zinn, Macpeak & Seas

[57] ABSTRACT

A reflection-type photosensor is formed in a body of U-shape with lenses formed on arms of the U. The optical axes of the lenses intersect at a location outside of the U-shape at a position above the gap between the arms. The surface roughness of facing surfaces of the arms is such as to cause light dispersion. Leads are formed in parallel within the body and exit the bottom surface. The light emitter and light detector may be mounted on thinned parts of first leads such that peripheral portions of the first leads serve as reflective surfaces.

8 Claims, 2 Drawing Sheets

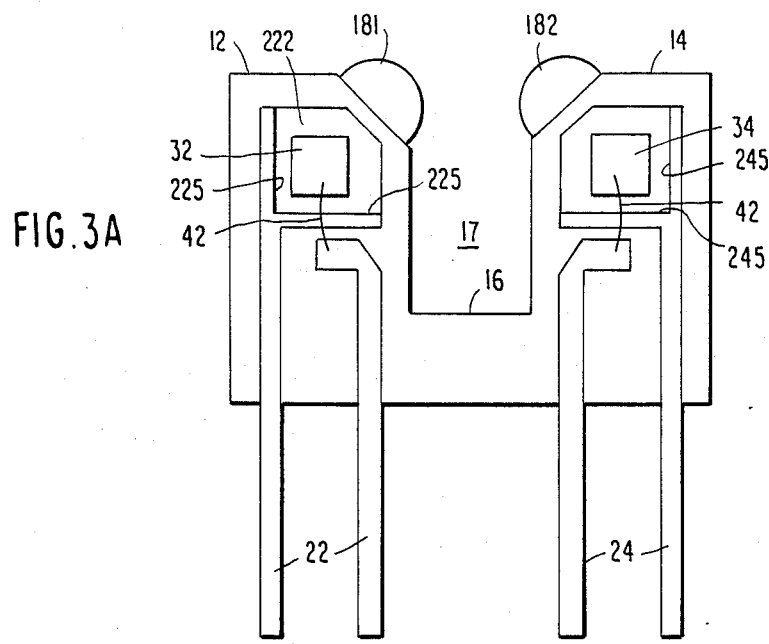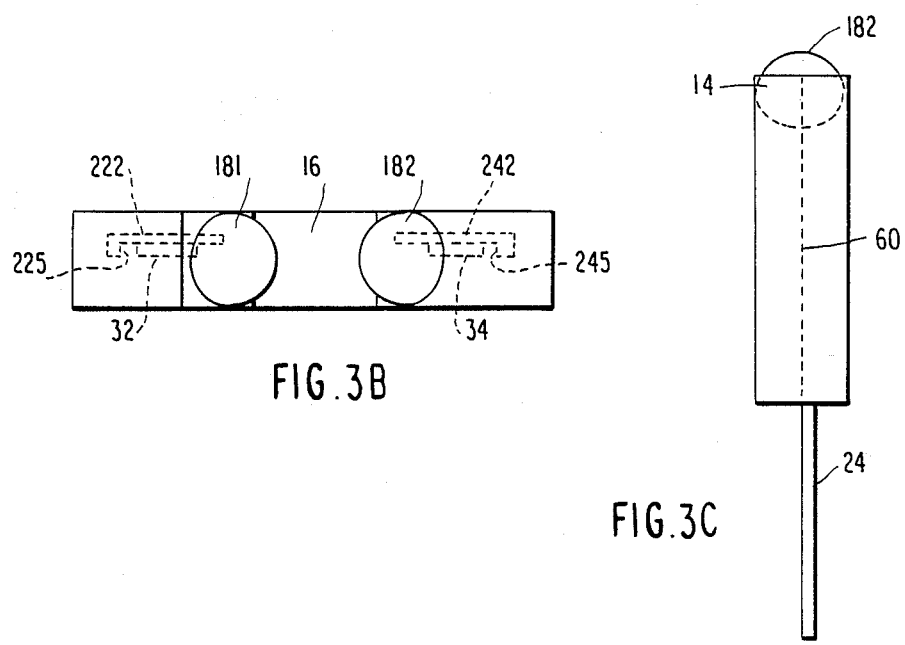

REFLECTION-TYPE PHOTOSENSOR

BACKGROUND OF THE INVENTION

The present invention relates to a reflection-type photosensor, and more particularly to a simple resin-molded reflection-type photosensor.

In a conventional reflection-type photosensor, utilized as a pattern recognition sensor or a tape-end sensor for a VCR (video cassette recorder), the light emitting portion and the light detecting portion are prepared separately and then assembled into a unit package such that they are spaced from one another and coupled with respect to radiation emitted and detected thereby, via a reflective object.

Such conventional reflection-type photosensor has a ceramic substrate with a pir of recesses in one surface thereof, input leads and output leads implanted into the substrate such that the leads extend from the bottoms of the recesses to the other surface of the substrate, and a light emitting pellet and a light detecting pellet which are respectively disposed within the two recesses and mounted on tip ends of respective ones of the input and output leads with the other electrodes electrically connected to tip ends of respective other ones of the input and output leads. The recesses are filled with a transparent silicone resin and covered with a transparent cap.

In the conventional reflection-type photosensor, however, the structure becomes bulky, and in addition, the assembly work is complicated.

SUMMARY OF THE INVENTION

An object of the invention is to provide a reflection-type photosensor with a resin-molded single package which is adaptable to mass productivity at low cost.

Another object of the invention is to provide a reflection-type photosensor with a resin-molded structure of a size smaller than the prior art structure.

One of the features of the invention resides in that pellet-mounting areas of leads in light emitting and detecting portions are disposed substantially in the same plane within a single molded package with a pair of lenses, and a light emitting pellet and a light detecting pellet are photocoupled in side-by-side relationship so that the structure is made suitable to mass production.

In order to attain enhancement of the optocoupling efficiency, it is preferable to provide a reflection portion in the leads for mounting the pellets. That is, the pellet mounting areas are recessed or thinned to form stairs or steps between the pellet mounting areas and the remaining area of the leads. The wall of the stair can be utilized for light reflection.

Still further, an air gap is provided between the emitting portion and the detecting portion, and preferably, at least inside surfaces of the air gap are finished with a rough surface.

BRIEF DESCRIPTION OF THE DRAWINGS

FIG. 3A, FIG. 3B and FIG. 3C are a front view, a top view and a right side view, respectively of a second embodiment.

DESCRIPTION OF THE PREFERRED EMBODIMENT

Figure 1:
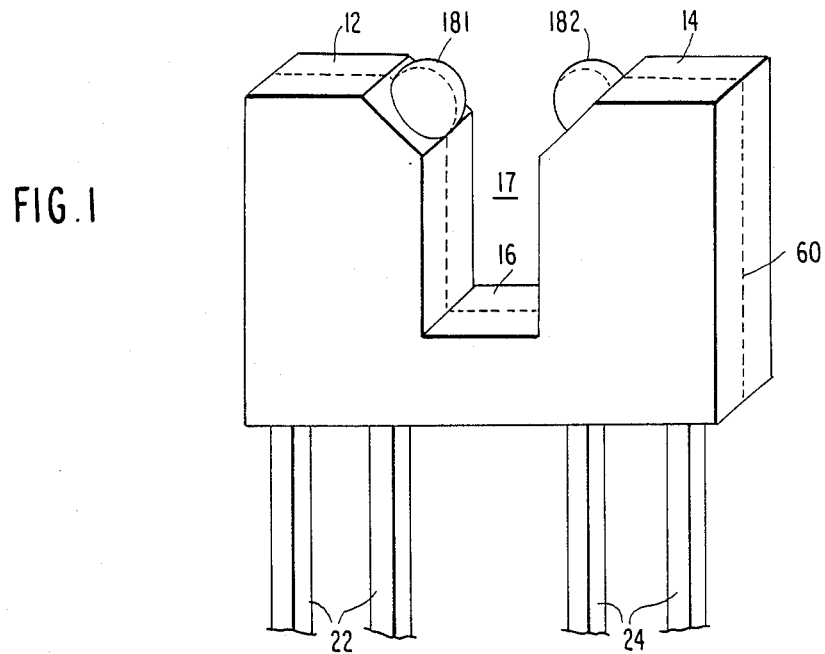
FIG. 1 is a perspective view showing the surface appearance of a reflection-type photosensor according to a first embodiment of the invention.
Figure 2:
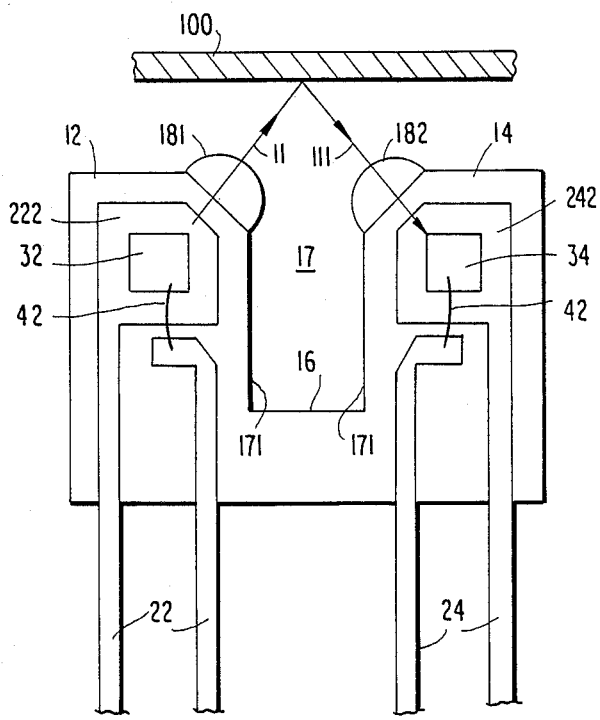
FIG. 2 is a cross-sectional view of FIG. 1.

Referring to FIG. 1 and FIG. 2, a light emitting portion 12 comprises a light emitting pellet 32 mounted on a mounting area 222 at a tip end of one of the two input leads 22 and electrically connected thereto. The other electrode (not shown) of the emitting pellet 32 is electrically connected to a tip end 224 of the other of the two input leads 22 through a bonding wire 42. Similarly, a light detecting portion 14 comprises light detecting pellet 34 mounted on a pellet mounting area 242 of one of two output leads 24. The other electrode (not shown) of the detecting pellet 34 is electrically connected to a tip end 244 of the other output lead 24. The emitting portion 12 and detecting portion 14 are supported by a bridge portion 16 so as to form an air gap portion 17 therebetween. The emitting portion 12 and detecting portion 14 are further provided with first and second convex lenses 181 and 182 located respectively at corner portions adjacent to the gap portion 17. The optical axis of the first lens 181 is aligned in a plane parallel to a principal surface of the emitting pellet 32 so as to converge the light emitted from the side surfaces of the emitting pellet 32 and direct the light toward the object 100. In the same manner, the optical axis of the second lens 182 is aligned in a plane parallel to a principal surface of the detecting pellet 34 so as to converge reflected light from the object 100 on the side surface of the detecting pellet 34. In other words, the optical axes are arranged so as to cross to each other above the gap portion 17.

According to this embodiment, since the air gap portion 17 is provided between the emitting portion 12 and detecting portion 14 and between the lenses 181 and 182, direct optocoupling between the emitting pellet 32 and detecting pellet 34 can be neglected for commercial use. This is because light dispersion occurs at both walls opposing each other through the air gap portion 17, thus the direct optocoupling, which is detected as noise, is decreased while reflected light, detected as a signal, is enhanced by the pair of the lenses 181 and 182. If the air gap portion were omitted, the signal to noise (S/N) ratio would be greatly decreased and the device could not be used in practice. To this end, it has previously been thought that a light shielding portion between the emitting portion and the detecting portion was unavoidable. This thinking has engendered a complicated manufacturing process and high cost.

According to the present invention, on the contrary, all of the emitting portion with its lens, the detecting portion with its lens and the bridge portion are commonly housed within a single resin-molded package thereby facilitating the manufacturing process. Furthermore, since all leads 22 and 24 are arranged in the same plate and both the pellet mounting areas 222 and 242 are present also in the same plane, the thickness of the molded package can be decreased. Moreover, all the leads 22, 24 can be derived from the same direction as illustrated, and therefore the width of the reflection-type photosensor or its dimension in the direction of the optical axis can reasonably be minimized. Since all the leads are derived in the same plane and in the same direction, a transfer molding technique using a two-split metal mold which is adaptable to mass production can easily be applied.

Where transfer molding is carried out by means of a two-split metal mold, the splice line of the mold must be matched with the lead frame surface. In FIG. 1, the splice line of the metal mold is indicated by a dotted line 60.

The single resin to be used for the molding should be transparent to the light emitted from the emitting pellet.

When the outside surface of the resin-molded package is made rough, except for the lens portion, the S/N ratio is further improved. Such modification can be easily achieved by finishing the inside surfaces of the two-split metal mold like a frosted glass surface except for the portion corresponding to the convex lenses which should be finished like a mirror surface.

The region of the rough surface or ground surface can be limited to only the opposing wall portions 171 exposed to the air gap portion 17.

FIG. 3A to FIG. 3C show another embodiment of the invention. Like reference numerals represent like parts in FIG. 1 and FIG. 2. What is different from the foregoing embodiment is that the pellet mounting areas of the leads take another form. As shown in FIG. 3A and FIG. 3B, the respective pellet mounting areas 222 and 242 of the leads are formed thinner than the thickness of the adjacent elongated lead wire portion 22, thereby providing a pair of stair wall portions 225 and 245 at two adjacent side edges of the pellet mounting area.

In this embodiment, part of the light coming from the emitting pellet 32 is reflected by the pair of stair wall portions 225, and likewise, part of the light incident on the detecting portion is reflected at a pair of stair wall portions 245 of the output lead 26 toward the detecting pellet 34 to increase the quantity of the incident light, thus contributing to an enhancement of the photocoupling efficiency.

The thin portions of the element mounting areas are formed concurrently when forming the lead frames by appropriately designing the lead frame punch cutting die and therefore manufacturing processing will not be increased thereby. It is apparent that the lead frames can be formed not only through punching but also by a known etching process.

As a typical example of the invention, a light emitting diode (LED) of gallium arsenide (GaAs) and emitting infrared rays is used as the emitting pellet 32, and a phototransistor of silicon (Si) is used as the detecting pellet 34. Each pellet is mounted on a silver plated iron lead frame with silver paste. The pellets are then subjected to transfer molding after wire bonding by means of gold wire. An infrared ray transmissive, visible light blocking resin or, for example, a product known as NT8513-9700 (manufactured by Nitto Electric Industrial Co., Ltd.) which uses visible light blocking dyestuff mixed in an epoxy resin, is used as the molding resin.

Referring to typical dimensions of each part, the resin-molded package is 11.0 mm in overall width, 2.5 mm in thickness and 8.5 mm in height. Each convex lens 181, 182 is semispherical and 2 mm in diameter. The distance between vertices of the convex lenses 181 and 182 is 3.0 mm. The thickness of the pellet mounting areas of both leads is 0.26 mm, while that of the remaining area of the leads is 0.46 mm. Thus, the height of stair wall portions 225 and 245 is 0.2 mm. Since the thickness of the ordinary emitting and detecting pellets is about 0.2 mm, the stair wall portions may act effectively as reflectors. When the outside surface of the resin-molded package except for lens portions has a roughness of about 5 to 10 $\mu$m, noise or leak current is decreased by one half.

The reflection-type photosensor according to the present invention is not limited to the aforementioned materials and dimensions.

As described above, since the reflection-type photosensor according to the invention can be miniaturized and made thin, it is capable of complying fully with current requirements that electronic parts be designed thin and small. The manufacturing process can be facilitated and the quantity of resin needed can also be decreased according to the invention, to attain a reflection-type photosensor adaptable to mass production at a low cost.

We claim:

1. A reflection-type photosensor comprising:
   first, second, third and fourth leads aligned in a first plane and in parallel with each other, said first and third leads having pellet mounting surfaces disposed substantially in said first plane;
   a light emitting pellet mounted on said mounting surface of said first lead and connected to said second lead;
   a light detecting pellet mounted on said mounting surface of said third lead and connected to said fourth lead, each of said light emitting pellet and light detecting pellet having a pair of major surfaces and side surfaces extending therebetween, one of said major surfaces being mounted to a pellet mounting surface; and
   a substantially U-shaped body of a single resin molding encapsulating said light emitting pellet and said detecting pellet with said, first, second, third and fourth leads such that said first, second, third and fourth leads are all led out from the same surface of said body, said body defining two spaced arms having facing surfaces separated by a gap, and a bridge portion for bridging a part of said gap to connect said arms to one another, a first of said arms housing said light emitting pellet such that one of said facing surfaces is opposed to one of said side surfaces of said light detecting pellet, a second of said arms housing said light detecting pellet such that the other of said facing surfaces is opposed to one of said side surfaces of said light detecting pellet, said body further having first and second lenses at outer edge portions of said facing surfaces, said first lens having a first optical axis aligned substantially in said first plane such that the light emitted from side surfaces of said light emitting pellet is directed outside of said gap, said second lens having a second optical axis aligned substantially in said first plane and being crossed with said first optical axis such that the light coming from outside said gap is directed toward said side surface of said light detecting pellet.

2. The reflection-type photosensor as claimed in claim 1, wherein said mounting surfaces of said first and third leads are made thin to define adjacent thicker peripheral stair wall portions for reflecting light directed thereto.

3. The reflection-type photosensor as claimed in claim 1, wherein at least said facing surfaces having a higher surface roughness than surfaces of said first and second lenses.

4. The reflection-type photosensor as claimed in claim 3, wherein said facing surfaces disperse light incident thereto.

5. The reflection-type photosensor as claimed in claim 1, wherein said resin is transparent to infrared light but blocks visible light.

6. The reflection-type photosensor as claimed in claim 2, wherein said reflective stair wall portions are formed on two adjoining edges of said mounting surfaces.

7. In a reflection-type photosensor comprising a substantially U-shaped body of a molded resin, said body defining two spaced arms having facing surfaces separated by a gap, and a bridge portion for bridging a part of said gap to connect said arms to one another; a first of said arms housing first and second leads connected to a light emitter, and a second of said arms having third and fourth leads connected to a light detector, a first light directing means for directing light from said emitter toward a reflective object located outside of said gap, second light directing means for directing light reflected from said reflective object toward said detector; the improvement wherein said first, second, third and fourth leads are juxtaposed in a first plane perpendicular to said facing surfaces and are directly molded within a single resin molding which is transparent to infrared light but blocks visible light, said first and second light directing means comprising first and second molded resin lenses formed on said first and second arms, respectively, via said single resin molding and having intersecting optical axes disposed substantially in said first plane, and said facing surfaces having a roughness sufficient to disperse light incident thereto.

8. A reflection-type photosensor, comprising:
a first flat lead member having a first lead-out portion elongated substantially in a first direction and a first element mounting portion extending from one end of said first lead-out portion in a second direction substantially perpendicular to said first direction, said first element mounting portion having a major flat surface which is in parallel with a surface of said first lead-out portion and is positioned at a level lower than said surface of said first lead-out portion, a second flat lead member disposed on that side of said first flat lead member from which said first element mounting portion is extended and having a second lead-out portion elongated substantially in said first direction and a second element mounting portion extending from one end of said second lead-out portion in said second direction toward said first element mounting portion, said second element mounting portion having a major flat surface which is in parallel with a surface of said second lead-out portion and is positioned at a level lower than said surface of said second lead-out portion, said major flat surface of said second element mounting portion and said major flat surface of said first element mounting portion being substantially at the same level, said first flat lead member having a first reflective wall at a step between said major flat surface of said first element mounting portion and said surface of said first lead-out portion, said second flat lead member having a second reflective wall at a step between said major flat surface of said first element mounting portion and said surface of said first lead-out portion, a third flat lead member disposed between said first and second lead members and having a third lead-out portion elongated along said first lead-out portion and substantially in said first direction and a first wire-bonding portion at one end of said third lead-out portion located adjacent to said first element mounting portion such that said first wire-bonding portion is spaced from said first element mounting portion in said first direction, a fourth flat lead member disposed between said second and third lead members and having a fourth lead-out portion elongated along said second lead-out portion and substantially in said first direction and a second wire-bonding portion at one end of said fourth lead-out portion located adjacent to said second element mounting portion such that said second wire-bonding portion is spaced apart from said second element mounting portion in said first direction, all of said first, second, third and fourth lead members being disposed substantially in the same plane, a light emitting pellet mounted on said major flat surface of said first element mounting portion such that one side end of said light emitting pellet is opposed to said first reflective wall, a first bonding wire electrically connecting said light emitting pellet to said first wire-bonding portion, a light detecting pellet mounted on said major flat surface of said second element mounting portion such that one side end of said light detecting pellet is opposed to said second reflective wall, a generally U-shaped body of a molded resin, said body defining two spaced arms having facing surfaces separated by a gap, and a bridge portion for bridging a part of said gap to connect said arms to one another, a first of said arms housing said first and third lead members and said light emitting pellet, and a second of said arms housing said second and fourth lead members of said light detecting pellet, first and second lenses respectively formed on said first and second arms and having intersecting optical axes, said facing surfaces having a roughness sufficient to disperse light incident thereto.

* * * * *

UNITED STATES PATENT AND TRADEMARK OFFICE
CERTIFICATE OF CORRECTION

PATENT NO. : 4,833,318
DATED : MAY 23, 1989
INVENTOR(S) : YONEKURA et al.

It is certified that error appears in the above-identified patent and that said Letters Patent is hereby corrected as shown below:

Column 1, line 18, delete "pir" and insert --pair--.

Column 2, line 56, delete "plate" and insert --plane--.

Column 4, line 43, delete "detecting" and insert --emitting--.

Signed and Sealed this

Sixth Day of February, 1990

Attest:

JEFFREY M. SAMUELS

Attesting Officer    Acting Commissioner of Patents and Trademarks